United States Patent
Eidloth et al.

(10) Patent No.: US 10,598,218 B2
(45) Date of Patent: Mar. 24, 2020

(54) ANGULAR CONTACT ROLLER BEARING AND METHOD AND DEVICE FOR THE ASSEMBLY THEREOF

(71) Applicant: Schaeffler Technologies AG & Co. KG, Herzogenaurach (DE)

(72) Inventors: Rainer Eidloth, Herzogenaurach (DE); Reinhard Rumpel, Rottendorf (DE); Heinrich Hofmann, Schweinfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/743,696

(22) PCT Filed: Aug. 3, 2016

(86) PCT No.: PCT/DE2016/200356
§ 371 (c)(1),
(2) Date: May 11, 2018

(87) PCT Pub. No.: WO2017/020908
PCT Pub. Date: Feb. 9, 2017

(65) Prior Publication Data
US 2018/0252262 A1    Sep. 6, 2018

(30) Foreign Application Priority Data

Aug. 4, 2015   (DE) .......................... 10 2015 214 845

(51) Int. Cl.
*F16C 19/36*   (2006.01)
*F16C 33/36*   (2006.01)
(Continued)

(52) U.S. Cl.
CPC .......... *F16C 19/364* (2013.01); *F16C 33/366* (2013.01); *F16C 33/585* (2013.01);
(Continued)

(58) Field of Classification Search
CPC .... F16C 19/225; F16C 19/364; F16C 33/366; F16C 33/4605; F16C 43/06; F16C 33/495;
(Continued)

(56) References Cited

U.S. PATENT DOCUMENTS 1,194,918 A * 8/1916 Wright .................. F16C 19/364
                                                    384/571
1,617,319 A    2/1927 Buckwalter
(Continued)

FOREIGN PATENT DOCUMENTS

CH       463886 A      10/1968
CN    102135133 A       7/2011
(Continued)

OTHER PUBLICATIONS

"Walzlager" ["Rolling Bearings"], Schaeffler Catalog dated Oct. 2008, pp. 393 and 396.
(Continued)

*Primary Examiner* — Marcus Charles
(74) *Attorney, Agent, or Firm* — Antun M. Peakovic

(57) ABSTRACT

Angular contact roller bearings are disclosed. The bearing may include an inner bearing ring with an inner raceway, which is arranged on the outer shell surface of said inner bearing ring so as to be oblique with respect to the bearing axis of rotation (AL), and comprising a rim which delimits said raceway at its smallest diameter. An outer bearing ring has an outer raceway, which is arranged on the inner shell surface of said outer bearing ring likewise so as to be oblique with respect to the bearing axis of rotation (AL), and a rim which delimits said raceway at its greatest diameter. A multiplicity of roller-type rolling bodies are arranged between the bearing rings and roll on the raceways of said bearing rings and are held with uniform spacings to one another in a circumferential direction by means of a bearing cage.

(Continued)

A tangent to the outer shell surface of the inner bearing ring and a tangent to the inner shell surface of the outer bearing ring are, at least in the region of the raceways, of planar form so as to run in opposite directions obliquely with respect to the bearing axis of rotation (AL). The raceways of the two bearing rings are each formed in conical fashion into said shell surfaces and the rims which are thus formed and which delimit the raceways in each case on one side are thus each formed integrally with the bearing rings.

13 Claims, 10 Drawing Sheets

(51) Int. Cl.
    *F16C 33/58*     (2006.01)
    *F16C 43/08*     (2006.01)
    *F16C 43/06*     (2006.01)
    *F16C 33/46*     (2006.01)
    *F16C 33/49*     (2006.01)
    *F16C 19/22*     (2006.01)

(52) U.S. Cl.
    CPC ............ *F16C 43/06* (2013.01); *F16C 43/083* (2013.01); *F16C 19/225* (2013.01); *F16C 33/4605* (2013.01); *F16C 33/495* (2013.01); *F16C 33/586* (2013.01); *F16C 43/065* (2013.01); *F16C 43/08* (2013.01)

(58) Field of Classification Search
    CPC ...... F16C 33/585; F16C 43/065; F16C 43/08; F16C 43/083
    USPC ................. 384/559, 561, 564–565, 571–572
    See application file for complete search history.

(56) References Cited

U.S. PATENT DOCUMENTS

| | | | |
|---|---|---|---|
| 1,787,712 A * | 1/1931 | Wooler | F16C 19/364 384/571 |
| 2,042,417 A | 5/1936 | Wise | |
| 2,633,627 A | 4/1953 | Olmstead | |
| 2,885,767 A | 5/1959 | Barish | |
| 3,420,589 A * | 1/1969 | Williams | F16C 19/225 384/620 |
| 3,783,482 A | 1/1974 | Kunert et al. | |
| 3,842,472 A | 10/1974 | Rottacker et al. | |
| 3,960,419 A | 6/1976 | Brawley | |
| 3,989,326 A * | 11/1976 | Hormann | F16C 19/364 384/572 |
| 4,138,170 A | 2/1979 | Markfelder et al. | |
| 5,735,612 A * | 4/1998 | Fox | F16C 19/364 384/448 |
| 7,819,589 B2 | 10/2010 | Hofmann et al. | |
| 8,356,944 B2 * | 1/2013 | Fox | F16C 19/548 29/898.09 |
| 8,904,645 B2 | 12/2014 | Varnoux | |
| 10,030,698 B2 | 7/2018 | Bernreuther | |

FOREIGN PATENT DOCUMENTS

| | | | | |
|---|---|---|---|---|
| DE | 151483 C | 5/1904 | | |
| DE | 168499 C | 3/1906 | | |
| DE | 344090 C | 11/1921 | | |
| DE | 6917609 U | 9/1969 | | |
| DE | 2154545 A1 | 5/1973 | | |
| DE | 2407477 A1 | 8/1975 | | |
| DE | 2420210 A1 | 10/1975 | | |
| DE | 2720887 A1 | 12/1977 | | |
| DE | 2651827 A1 | 5/1978 | | |
| DE | 8713057 U1 | 12/1987 | | |
| DE | 102015205987 A1 * | 10/2016 | ............. | F16C 33/41 |
| GB | 1278127 | 6/1972 | | |
| JP | 2013015200 A * | 1/2013 | ............. | F16C 33/495 |
| JP | 2014231899 A * | 12/2014 | ............. | F16C 33/36 |

OTHER PUBLICATIONS

Chinese Office Action; CN107850128; 7 pages dated Feb. 19, 2019 from Chinese Intellectual Property Office.

* cited by examiner

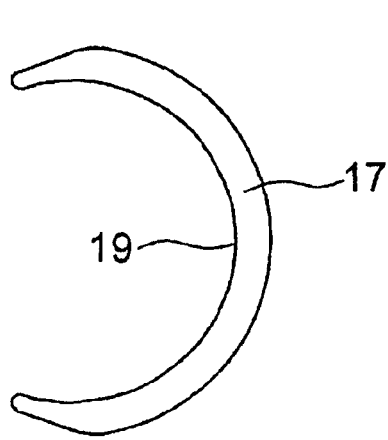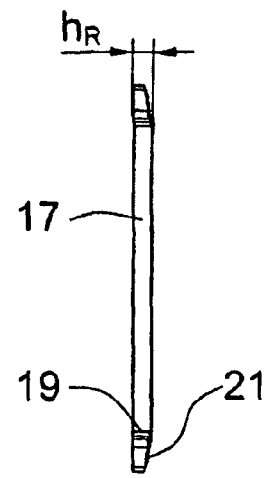
Fig. 10a        Fig. 10b
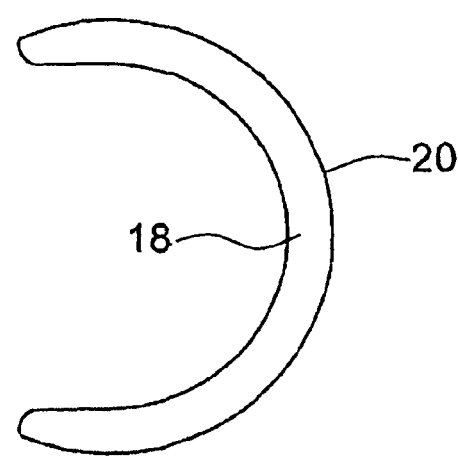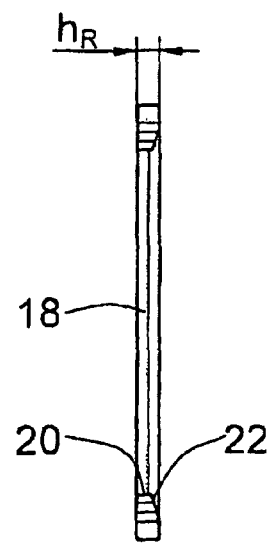
Fig. 11a        Fig. 11b

ANGULAR CONTACT ROLLER BEARING AND METHOD AND DEVICE FOR THE ASSEMBLY THEREOF

CROSS-REFERENCE TO RELATED APPLICATIONS

This application is the U.S. National Phase of PCT Appln. No. PCT/DE2016/200356 filed Aug. 3, 2016, which claims priority to DE 102015214845.9 filed Aug. 4, 2015, the entire disclosures of which are incorporated by reference herein.

TECHNICAL FIELD

The disclosure relates to a single-row angular contact roller bearing, which angular contact roller bearing can be used particularly advantageously as a fixed bearing for the mounting of the main shaft in a motor vehicle transmission. The disclosure furthermore relates to multiple variants of a method and a device for assembling the angular contact roller bearing.

BACKGROUND

The bearing type most commonly used as a fixed bearing for the mounting of the main shaft in a motor vehicle transmission is the single-row deep-groove ball bearing, because this is distinguished by uniformly high radial and axial load capacities and has the highest rotational speed limits of all bearing types owing to its low friction. Said deep-groove ball bearing is, in a known manner, composed of an outer bearing ring and of an inner bearing ring and of a multiplicity of bearing balls arranged between the bearing rings, which bearing balls roll in groove-like raceways formed into the inner side of the outer bearing ring and into the outer side of the inner bearing ring and are guided with uniform spacings to one another by means of a bearing cage. Here, the insertion of the bearing balls into the deep-groove ball bearing is normally performed using the eccentric assembly method that has become known from DE 168 499 A1, in which the two bearing rings are arranged eccentrically with respect to one another, the free space thus formed between the bearing rings is filled with the bearing balls, the bearing rings are subsequently moved into a concentric position with respect to one another utilizing their elasticity, and the bearing cage is inserted after the bearing balls have been uniformly circumferentially distributed.

In practice, however, it has been found that such deep-groove ball bearings, owing to the small maximum number of bearing balls that can be installed, which number is dependent on the dimensions of the inner and of the outer bearing ring and on the diameter of the bearing balls, are always subject to certain limits in particular with regard to the radial load capacity of the bearing. In the past, therefore, a multiplicity of solutions has been proposed, such as for example a non-closed filling opening arranged in the oppositely situated rims of the raceway of the outer and of the inner bearing ring, as per DE 151 483 A1, or a similarly designed closable filling opening, as per DE 24 07 477 A1, by means of which it has been sought to achieve an increase in the radial load capacity of deep-groove ball bearings through an increase in the number of bearing balls, though said solutions have not been able to become established in practice owing to the disadvantages resulting from such filling openings.

Another possibility for increasing the load capacity of the fixed bearing for the mounting of the main shaft in a motor vehicle transmission would be to replace the previously used deep-groove ball bearing with a cylindrical roller bearing of the type NUP, such as is known for example from the applicant's catalogue "Walzlager" ["Rolling bearings"], dated October 2008, on pages 393 and 396. Said cylindrical roller bearing has two lateral rims both on the inner bearing ring and on the outer bearing ring, and is suitable for accommodating high radial loads and axial loads in both directions. Such cylindrical roller bearings however have very high manufacturing costs owing to the high level of cutting machining, in particular for the raceway production and for the rim machining, and would furthermore in turn be overdimensioned in terms of their load capacity, such that they are ultimately unsuitable for use as fixed bearings in motor vehicle manual transmissions.

A further bearing type which is suitable as a fixed bearing for the mounting of the main shaft in a motor vehicle transmission and which forms the closest prior art for the present disclosure and whose capacity for accommodating radial forces and axial forces in both directions is greater than that of deep-groove ball bearings has become known from the documents DE 6 917 609 U and CH 463 886 A. Said documents each disclose an angular contact roller bearing which is composed substantially of an inner bearing ring with an inner raceway, which is arranged on the outer shell surface of said inner bearing ring obliquely with respect to the radial bearing axis, and of a rim which delimits said raceway at its smallest diameter, of an outer bearing ring with outer raceway, which is arranged on the inner shell surface of said outer bearing ring, likewise obliquely with respect to the radial bearing axis, and of a rim which delimits said raceway at its greatest diameter, and of a multiplicity of roller-type rolling bodies which are arranged between the bearing rings and which roll on the raceways of said bearing rings and which are held with uniform spacings to one another in a circumferential direction by means of a bearing cage. To permit the insertion of the rolling bodies in the form of tapered rollers into the bearing cage which is formed in each case as a pocket-type or window-type cage, it is the case that the rim on the inner bearing ring in the case of the angular contact roller bearing as per DE 6 917 609 U, and the rim on the outer bearing ring in the case of the angular contact roller bearing as per CH 463 886 A, is formed as a separate component which is fastened to the inner or outer bearing ring respectively after the bearing assembly process. This is performed, in the case of the angular contact roller bearing as per DE 6 917 609 U, through a separate slotted ring which is U-shaped in cross section and the radial limbs of which engage in to corresponding grooves in the rim and in the inner bearing ring, and in the case of the angular contact roller bearing as per CH 463 886 A, through an encircling collar integrally formed on the underside of the rim, which collar is pressed into the outer bearing ring.

In such angular contact roller bearings, although the fact that only one of the bearing rings is formed integrally with only one lateral rim has the effect that the level of cutting machining during the raceway production and during the rim machining, and thus also the overall costs for the bearing manufacture, are much lower than in the case of the cylindrical roller bearing described above, it is nevertheless the case in such angular contact roller bearings that the formation of the rim on the respective other bearing ring as a separate rim disk, the additional installation thereof on said bearing ring and the required precision manufacture of the contact surfaces on said rim disk and on the associated bearing ring have an adverse effect on the production costs thereof. Furthermore, in the case of such angular contact roller bearings, there is the risk that the fastening of the separate rim disk is not sufficient to withstand even high radial or axial load peaks, such that the rim disk can become detached during bearing operation, ultimately resulting in bearing failure.

SUMMARY

Proceeding from the discussed disadvantages of the solutions of the known prior art, it is therefore an object of the disclosure to design an in particular single-row angular contact roller bearing which has a greater radial and axial load capacity than a deep-groove ball bearing and which is distinguished by a low level of cutting machining for the raceway and rim production and by low assembly outlay and thus by low overall costs for the bearing manufacture.

According to the disclosure, said object is achieved in the case of an angular contact roller bearing as disclosed herein firstly in that the rims which delimit the raceways in each case on one side are each formed integrally with the bearing rings and the greatest diameter of the inner raceway is smaller than the sum of the smallest diameter of the inner raceway and the height of the rim that delimits the inner raceway, and in that the smallest diameter of the outer raceway is smaller than the greatest diameter of the outer raceway minus the height of the rim that delimits the outer raceway.

Additional embodiments and advantageous refinements of the angular contact roller bearing designed according to the disclosure will be described below and in the figures.

Accordingly, in one embodiment, it is provided in the angular contact roller bearing designed according to the disclosure that the roller-type rolling bodies are preferably formed as tapered rollers which have a taper angle in the range from 2° to 6°, and which roll with an envelope circle angle of between 7° and 20° on their raceways. In the case of the angular contact roller bearing designed according to the disclosure being used as a fixed bearing for the mounting of the main shaft in a motor vehicle transmission, a taper angle of 4° and an envelope circle angle of 14° have proven to be particularly suitable here owing to the radial and axial loads that arise. It must however be noted that the design according to the disclosure is not intended to be restricted to a tapered roller bearing, because it is equally also possible for other roller bearings with roller axes arranged obliquely with respect to the bearing central axis to be designed in this way. Thus, instead of the tapered rollers mentioned by way of example, use may also be made of cylindrical rollers or needles or rollers with spherical shell surfaces, such as self-aligning rollers or barrel-type rollers.

According to another embodiment, it is a further feature of the angular contact roller bearing designed according to the disclosure that the gap between the bearing rings which exists on the smaller diameter side of the roller-type rolling bodies is designed to be smaller than the gap between the bearing rings which exists on the larger diameter side of the roller-type rolling bodies and is dimensioned such that two times its dimension is greater than the greatest diameter of the roller-type rolling bodies. Such dimensioning of the gap between the inner and the outer bearing ring is necessary in order to permit the insertion of the roller-type rolling bodies into the angular contact roller bearing in accordance with the assembly method described further below.

According to another embodiment, the angular contact roller bearing designed according to the disclosure is furthermore characterized in that the rim which delimits the raceway in the inner bearing ring has a minimum height of approximately 33% and the rim which delimits the raceway in the outer bearing ring has a minimum height of approximately 21% of the greatest diameter of the roller-type rolling bodies. By such a design of the rims and the associated raceway depth, it is ensured that high axial forces in one direction which arise during bearing operation can be accommodated with the least possible rim friction, whereas relatively low axial forces in the other direction are accommodated by the oblique raceways.

According to other embodiments, it is finally also an expedient refinement of the angular contact roller bearing designed according to the disclosure that the bearing cage is preferably formed by a comb-type cage which is insertable into the radial rolling bearing after the installation of the roller-type rolling bodies and which is composed of a cage ring and of a multiplicity of axial cage webs. Said bearing cage additionally has, on its cage webs, multiple uniformly circumferentially distributed detent lugs which have a smaller inner diameter than the cage ring and by which the bearing cage is axially fixable in position either on the inner surface of the rim on the inner bearing ring or on the inner surface of the rim on the outer bearing ring. Said detent lugs, during the insertion of the bearing cage into the angular contact roller bearing, are firstly elastically deformed in the direction of the cage webs until said detent lugs engage with detent action behind the rim on the inner bearing ring, in the case of the bearing cage being inserted from the small diameter side of the tapered rollers, and engage with detent action behind the rim on the outer bearing ring, in the case of the bearing cage being inserted from the large diameter side of the tapered rollers. In this way, the bearing cage, which was hitherto fixed in position only in one axial direction as a result of the abutment of the bearing cage against one of the face sides of the roller-type rolling bodies, is also fixed in position in the other axial direction. Here, too, however, it must be noted that the use of a comb-type cage as a bearing cage is not restricted to said cage type, because it is also possible for the bearing cage to be formed as a two-part plate rivet cage.

The stated object may furthermore be achieved, in the case of an angular contact roller bearing design according to the disclosure, by an assembly method which is distinguished by the fact that the angular contact roller bearing is assembled in accordance with an eccentric assembly method known as an assembly method for deep-groove ball bearings.

In a first variant of said eccentric assembly method, it is provided that, in a first step, the inner bearing ring is placed, with its face side formed with the rim, onto a horizontal assembly plane with a convex sickle-shaped auxiliary ramp in such a way that said inner bearing ring bears with its rim against the inner diameter side of the auxiliary ramp. Subsequently, in a second step, the outer bearing ring is arranged, with its face side formed with the rim upward, eccentrically with respect to the inner bearing ring such that, at one side, the auxiliary ramp is arranged between the bearing rings and, at the other side, offset 180° with respect to the center of the auxiliary ramp, the bearing rings bear against one another. Then, as a third step, the sickle-shaped free space formed between the outer bearing ring and the inner bearing ring is filled with the roller-type rolling bodies in the form of tapered rollers such that the relatively small face sides of said roller-type rolling bodies lie on the oblique side of the auxiliary ramp.

A second variant of the eccentric assembly method differs from the first variant in that, in a first step, the outer bearing ring is placed, with its face side formed with the rim, onto a horizontal assembly plane with a convex sickle-shaped auxiliary ramp in such a way that said outer bearing ring bears with its rim against the outer diameter side of the auxiliary ramp. Subsequently, in a second step, the inner bearing ring is arranged, with its face side formed with the rim upward, eccentrically with respect to the outer bearing ring such that, at one side, the auxiliary ramp is arranged between the bearing rings and, at the other side, offset 180° with respect to the center of the auxiliary ramp, the bearing rings bear against one another. Then, the third step of said variant consists again in that the sickle-shaped free space formed between the inner bearing ring and the outer bearing ring is filled with the roller-type rolling bodies in the form of tapered rollers such that the relatively large face sides of said roller-type rolling bodies lie on the oblique side of the auxiliary ramp.

Independently of the two variants of the eccentric assembly method, in another embodiment, in a fourth step, the outer bearing ring is clamped, at the level of the contact point with the inner bearing ring and at the level of a point on the outer shell surface of said outer bearing ring which is offset 180° with respect to the contact point, such that the outer bearing ring is slightly ovalized within its elasticity limit. Subsequently, in one embodiment, in a fifth step, the inner bearing ring is displaced into a coaxial position with respect to the outer bearing ring, and the roller-type rolling bodies are uniformly circumferentially distributed in their raceways in the bearing rings, with the ovalization of the outer bearing ring being eliminated.

In the case of the first variant of the eccentric assembly method according to the disclosure being implemented, it is subsequently the case in one embodiment, that, in a sixth and final step, the bearing cage in the form of a comb-type cage is inserted with its cage webs between the roller-type rolling bodies from the side with the relatively small face sides of said roller-type rolling bodies, and said bearing cage is engaged with detent action against the inner surface of the rim on the inner bearing ring. In the case of the second variant of the eccentric assembly method according to the disclosure being implemented, it is by contrast the case, in another embodiment, that, in a final step, the bearing cage in the form of a comb-type cage is inserted with its cage webs between the roller-type rolling bodies from the side with the relatively large face sides of said roller-type rolling bodies, and said bearing cage is engaged with detent action against the inner surface of the rim on the outer bearing ring.

Finally, the stated object is also achieved, in the case of an angular contact roller bearing designed according to the disclosure, by two variants of a device for carrying out the described assembly method.

Here, to carry out the first variant of the eccentric assembly method according to the disclosure, it is proposed in one embodiment that the auxiliary ramp which bears with its inner diameter side against the inner bearing ring has an oblique side, which tapers toward the outer bearing ring with the angle of inclination of the raceway in the inner bearing ring, and a maximum ramp height which corresponds to the rim height on the inner bearing ring. To carry out the second variant of the eccentric assembly method according to the disclosure, it is by contrast proposed in another embodiment that the auxiliary ramp which bears with its outer diameter side against the outer bearing ring has an oblique side, which tapers toward the inner bearing ring with the angle of inclination of the raceway in the outer bearing ring, and a maximum ramp height which corresponds to the rim height on the outer bearing ring.

In summary, the angular contact roller bearing designed according to the disclosure thus has the advantage in relation to the angular contact roller bearings known from the prior art that, despite the maximum rolling body fill factor of approximately 60% that is achievable with the eccentric assembly method, it has a greater load capacity than a similarly assembled single-row deep-groove ball bearing, because the roller-type rolling bodies that are used are in linear contact with their raceways rather than in punctiform contact as in the case of bearing balls. With regard to the achievable load capacity, an angular contact roller bearing designed according to the disclosure ranks here as a completely new bearing type [e.g. type series ARU (Angular Roller Unit) 207=40 kN] approximately in the middle between the load capacity of a single-row deep-groove ball bearing [e.g. type series 6207=25.5 kN] and the load capacity of a single-row cylindrical roller bearing [e.g. type series NUP 207E=56 kN]. Furthermore, owing to the singly conical raceways formed into the obliquely running planar inner and outer shell surfaces of the two bearing rings, the level of cutting machining during the production and machining of the raceways and of the rims of the angular contact roller bearing according to the disclosure falls within manageable cost limits, and, owing to the rims formed here, which are formed integrally with the bearing rings, there is at the same time no longer a need for separate rim disks. In conjunction with the eccentric assembly method for the roller-type rolling bodies and with the comb-type cage that is used, the angular contact roller bearing according to the disclosure is thus distinguished overall by a low level of assembly outlay and thus by low overall costs for the bearing manufacture.

BRIEF DESCRIPTION OF THE DRAWINGS

An embodiment of the angular contact roller bearing designed according to the disclosure and two alternative variants of the method for the assembly thereof and two associated devices for carrying out said method variants will be discussed in more detail below with reference to the appended drawings, in which:

FIGS. 10a, 10b show an illustration of the auxiliary ramp for carrying out the first variant of the assembly method according to the disclosure in a plan view and in a sectional view; and FIGS. 11a, 11b show an illustration of the auxiliary ramp for carrying out the second variant of the assembly method according to the disclosure in a plan view and in a sectional view.

DETAILED DESCRIPTION

Figure 1:
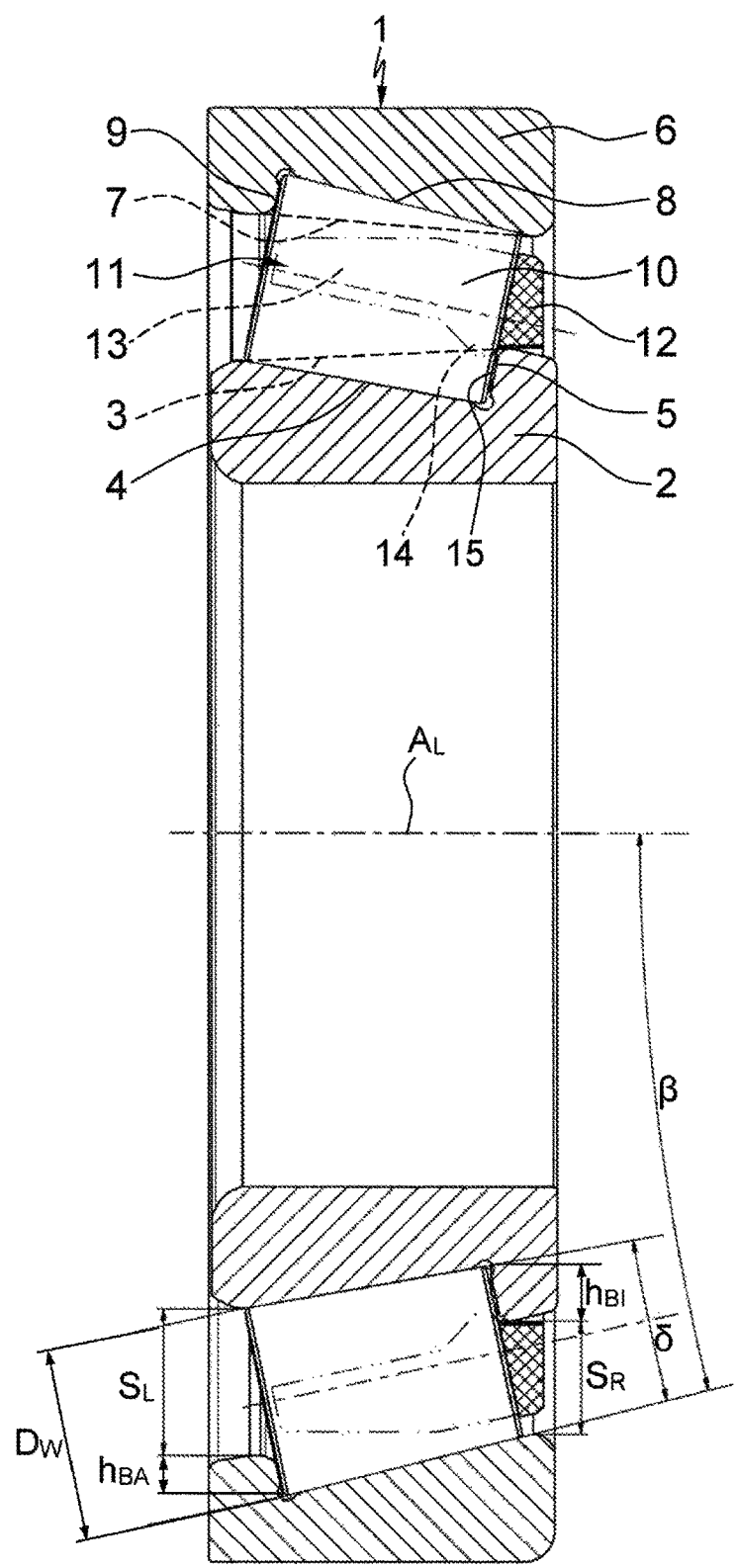
FIG. 1 shows an enlarged illustration of a cross section through an angular contact roller bearing designed according to the disclosure.

FIG. 1 illustrates a cross section through a radial rolling bearing designed as single-row angular contact roller bearing which is suitable for example as a replacement for the deep-groove ball bearing previously used as a fixed bearing for the mounting of the main shaft in motor vehicle transmissions. As can be clearly seen, said angular contact roller bearing 1 is composed of an inner bearing ring 2 with an inner raceway 4, which is arranged on the outer shell surface 3 of said inner bearing ring so as to be oblique with respect to the bearing central axis AL and which is delimited at its smallest diameter by a rim 5, and of an outer bearing ring 6 with an outer raceway 8, which is arranged on the inner shell surface 7 of said outer bearing ring likewise so as to be oblique with respect to the bearing central axis AL and which is delimited at its greatest diameter by a rim 9. Furthermore, between the bearing rings 2, 6, there is arranged a multiplicity of roller-type rolling bodies 10 which roll on the raceways 4, 8 of said bearing rings and which are held with uniform spacings to one another in a circumferential direction by a bearing cage 11.

It is furthermore indicated by the dashed lines in the upper bearing half in FIG. 1 that a tangent to the outer shell surface 3 of the inner bearing ring 2 and a tangent to the inner shell surface 7 of the outer bearing ring 6 are, at least in the region of the raceways 4, 8, of planar form so as to run in opposite directions obliquely with respect to the bearing axis of rotation AL, and the raceways 4, 8 of the two bearing rings 2, 6 are each formed in conical fashion into said shell surfaces. The rims 5, 9 which are thus formed and which delimit the raceways 4, 8 in each case on one side are thus each formed integrally with the bearing rings 2, 6.

It can likewise be seen in FIG. 1 that the roller-type rolling bodies 10 are formed as tapered rollers which have a taper angle δ preferably of 4° and which roll with an envelope circle angle β preferably of 14° on their raceways 4, 8. Furthermore, the gap SR between the bearing rings 2, 4 which exists on the smaller diameter side of the roller-type rolling bodies 10 is designed to be smaller than the gap SL between the bearing rings 2, 4 which exists on the larger diameter side of the roller-type rolling bodies 10 and is dimensioned such that two times its dimension is greater than the greatest diameter DW of the roller-type rolling bodies 10, in order to permit the insertion of the roller-type rolling bodies 10 into the radial rolling bearing 1 in accordance with the eccentric assembly method. Furthermore, the rim 5 which delimits the raceway 4 in the inner bearing ring 2 has a minimum height hBI of approximately 33% and the rim 9 which delimits the raceway 8 in the outer bearing ring 6 has a minimum height hBA of approximately 21% of the greatest diameter (DW) of the roller-type rolling bodies 10, in order to enable high axial forces in one direction that arise during bearing operation to be accommodated with the least possible rim friction.

Finally it can also be seen in FIG. 1 that the bearing cage 11 is preferably formed by a comb-type cage which is insertable into the radial rolling bearing 1 after the installation of the roller-type rolling bodies 10. Here, the bearing cage 11, which is composed of a cage ring 12 and of a multiplicity of axial cage webs 13, has, on its cage webs 13 (obscured in the illustration), multiple uniformly circumferentially distributed detent lugs 14 (likewise obscured in the illustration), which have a smaller inner diameter than the cage ring 12 and by which the bearing cage 11 is axially fixable in position on the inner surface 15 of the rim 5 on the inner bearing ring 2.

Figure 2A:
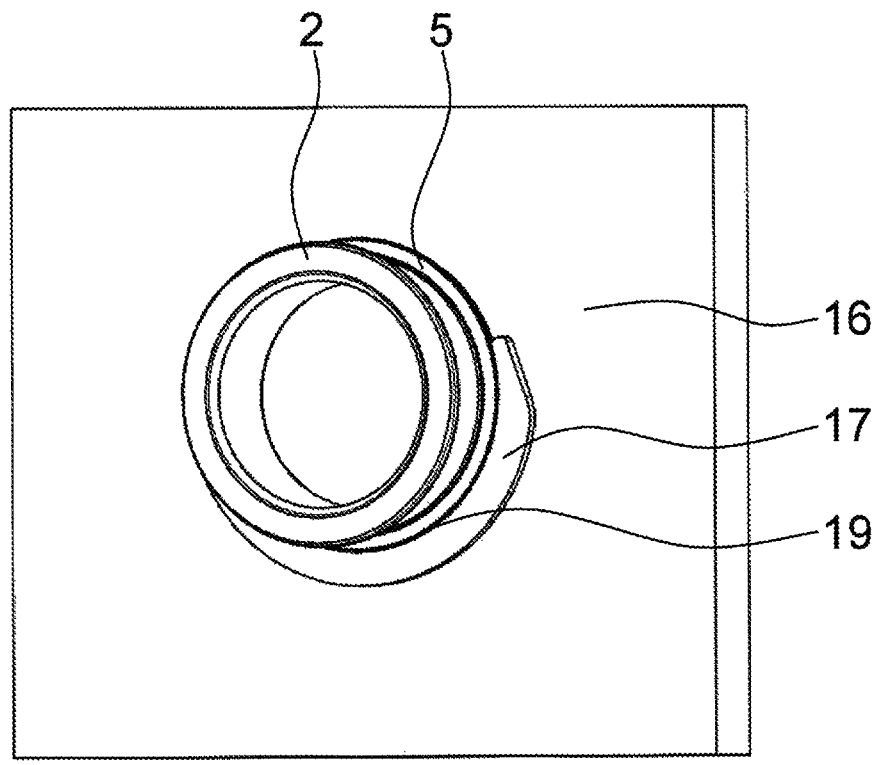
FIGS. 2a, 2b show an illustration of the first step of the first variant of the assembly method according to the disclosure in a plan view and in a sectional view.
Figure 2B:
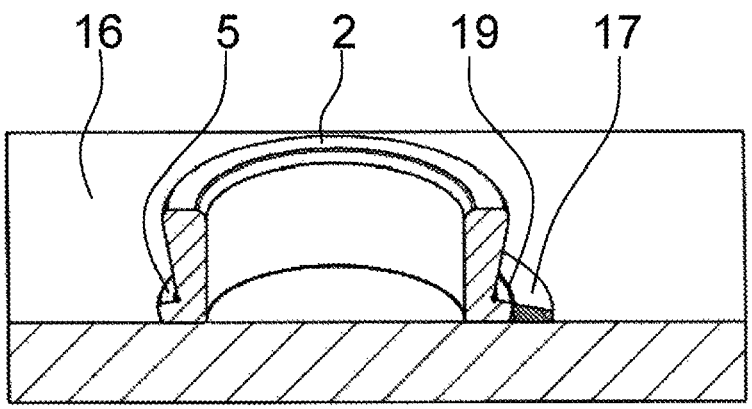

FIGS. 2a, 2b, 3a, 3b and 4a, 4b furthermore schematically illustrate the first steps of a first variant of an assembly method for the angular contact roller bearing 1 according to the disclosure. Said assembly method is substantially a modified eccentric assembly method known per se as an assembly method for deep-groove ball bearings, in the case of which, as can be seen in FIGS. 2a and 2b, in a first step, the inner bearing ring 2 is placed, with its face side formed with the rim 5, onto a horizontal assembly plane 16 with a convex sickle-shaped auxiliary ramp 17 in such a way that said inner bearing ring bears with its rim 5 against the inner diameter side 19 of the auxiliary ramp 17.

Figure 3A:
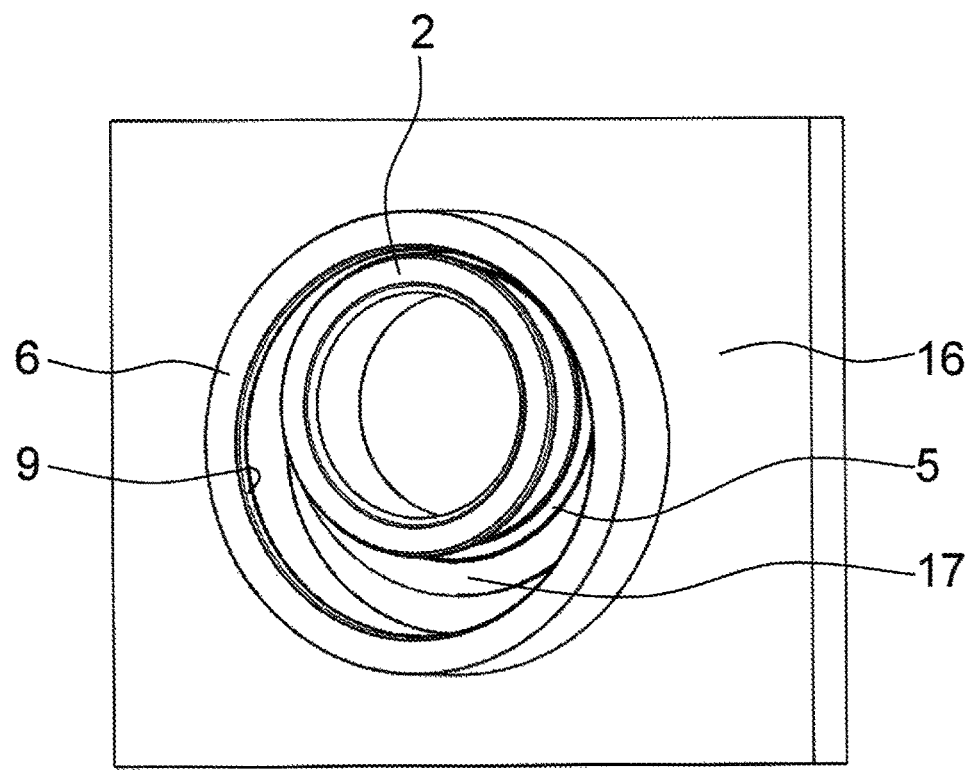
FIGS. 3a, 3b show an illustration of the second step of the first variant of the assembly method according to the disclosure in a plan view and in a sectional view.
Figure 3B:
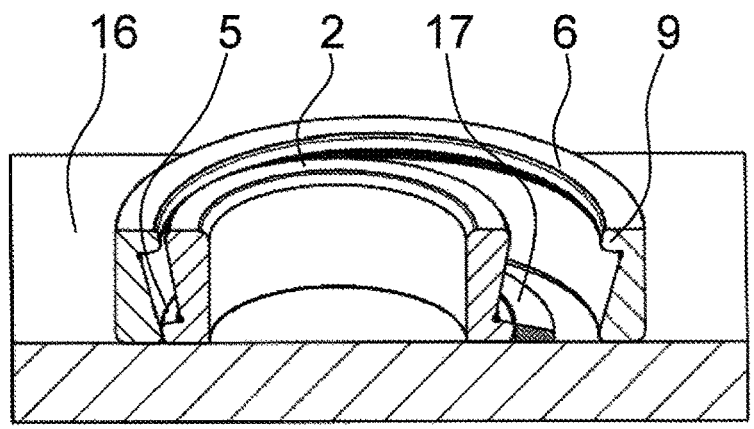

Subsequently, in a second step, the outer bearing ring 6 is arranged, with its face side formed with the rim 9 upward, eccentrically with respect to the inner bearing ring 2 such that, as can be clearly seen in FIGS. 3a and 3b, at one side, the auxiliary ramp 17 is arranged between the bearing rings 2, 6 and, at the other side, offset 180° with respect to the center of the auxiliary ramp 17, the bearing rings 2, 6 bear against one another.

Figure 4A:
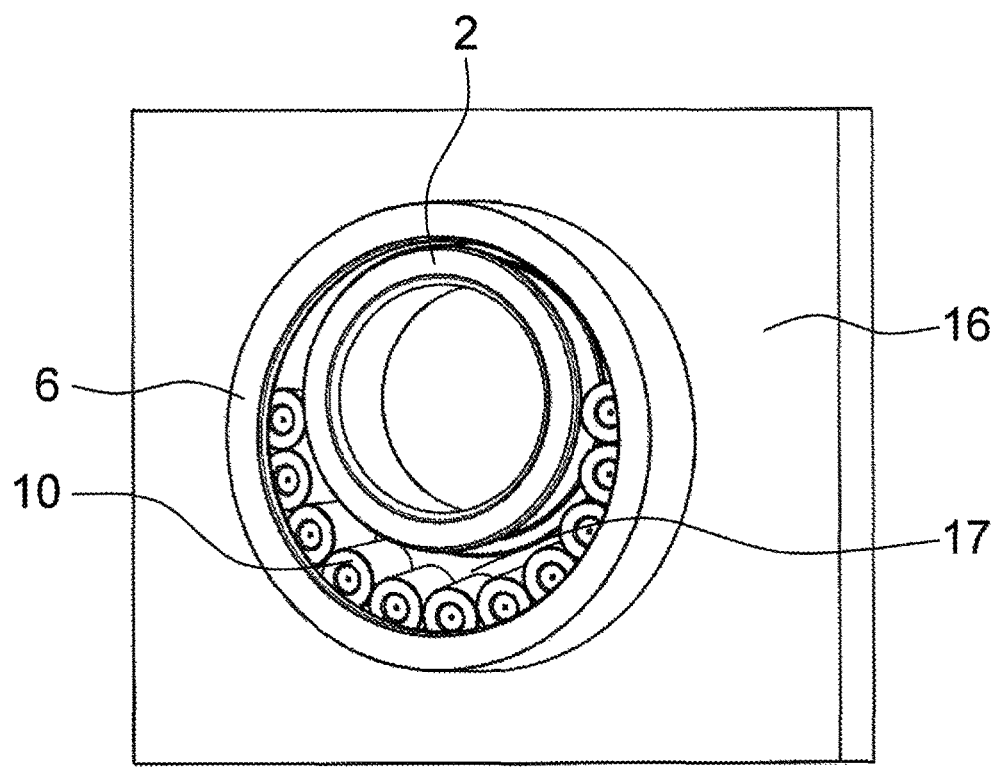
FIGS. 4a, 4b show an illustration of the third step of the first variant of the assembly method according to the disclosure in a plan view and in a sectional view.
Figure 4B:
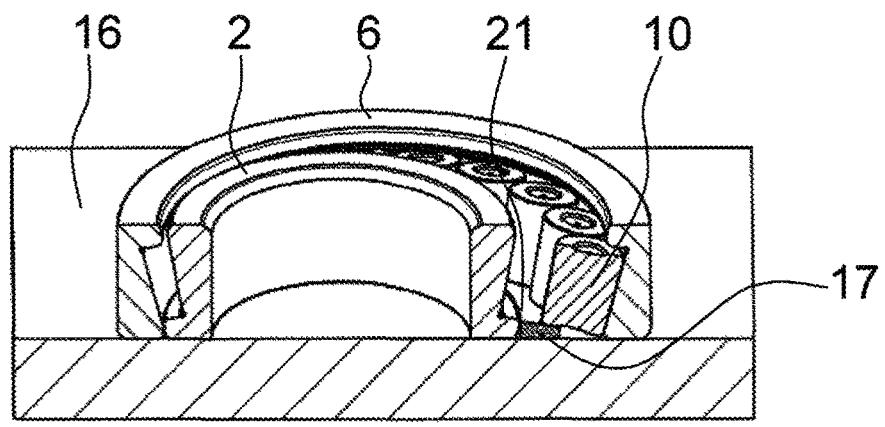

In a third step illustrated in FIGS. 4a and 4b, the sickle-shaped free space formed between the outer bearing ring 6 and the inner bearing ring 2 is filled with the roller-type rolling bodies 10 in the form of tapered rollers such that the relatively small face sides of said roller-type rolling bodies lie on the oblique side 21 of the auxiliary ramp 17.

Figure 5A:
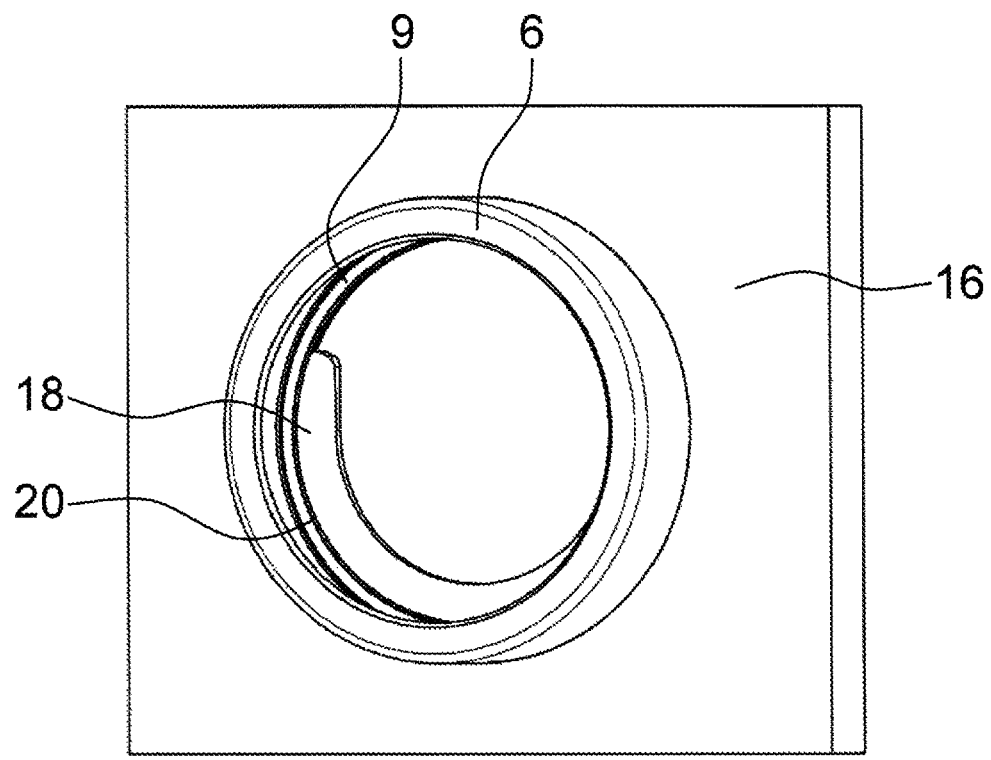
FIGS. 5a, 5b show an illustration of the first step of the second variant of the assembly method according to the disclosure in a plan view and in a sectional view.
Figure 5B:
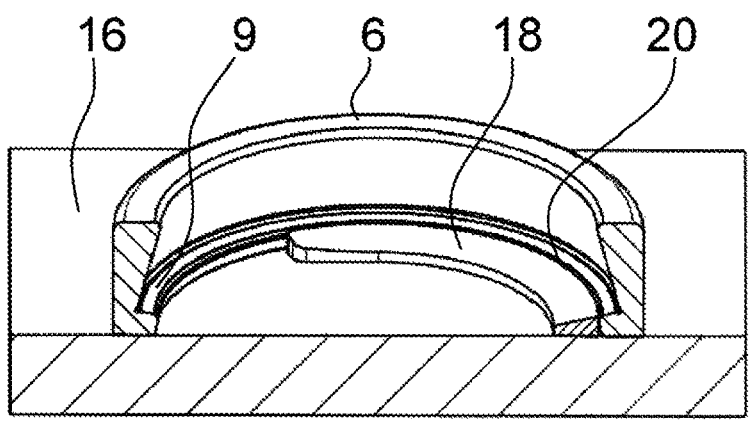

The second variant, illustrated in FIGS. 5a, 5b, 6a, 6b and 7a, 7b, of the assembly method for the angular contact roller bearing according to the disclosure is likewise a modified eccentric assembly method and differs from the first variant in that, in the first step shown in FIGS. 5a and 5b, in this case the outer bearing ring 6 is placed, with its face side formed with the rim 9, onto a horizontal assembly plane 16 with a convex sickle-shaped auxiliary ramp 18 in such a way that said outer bearing ring bears with its rim 9 against the outer diameter side 20 of the auxiliary ramp 18.

Figure 6A:
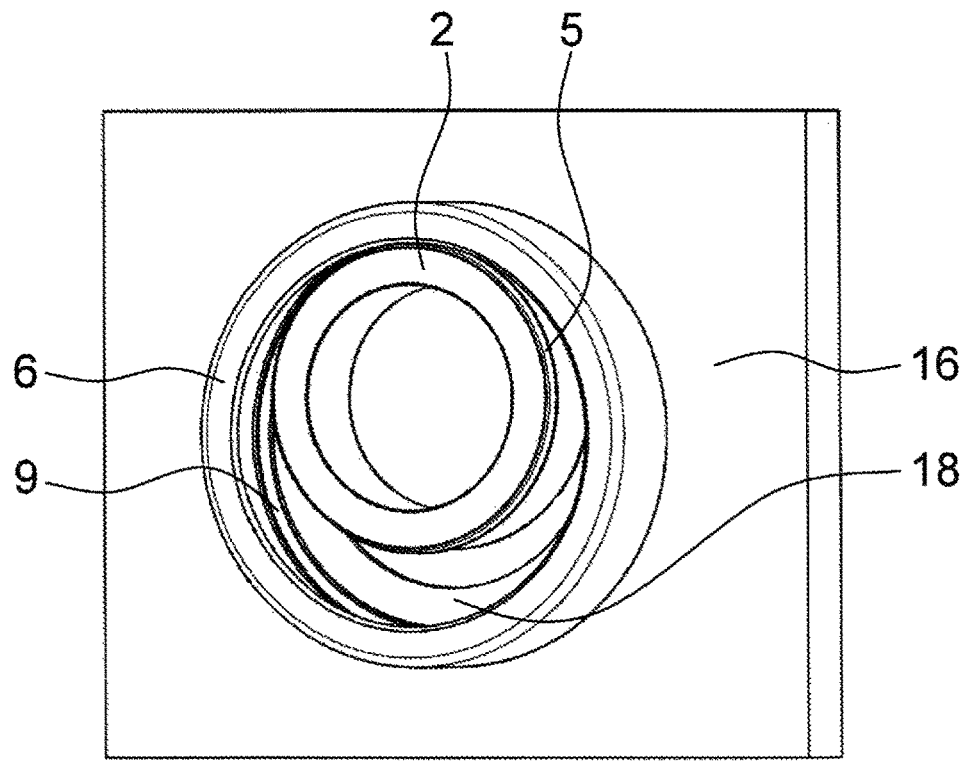
FIGS. 6a, 6b show an illustration of the second step of the second variant of the assembly method according to the disclosure in a plan view and in a sectional view.
Figure 6B:
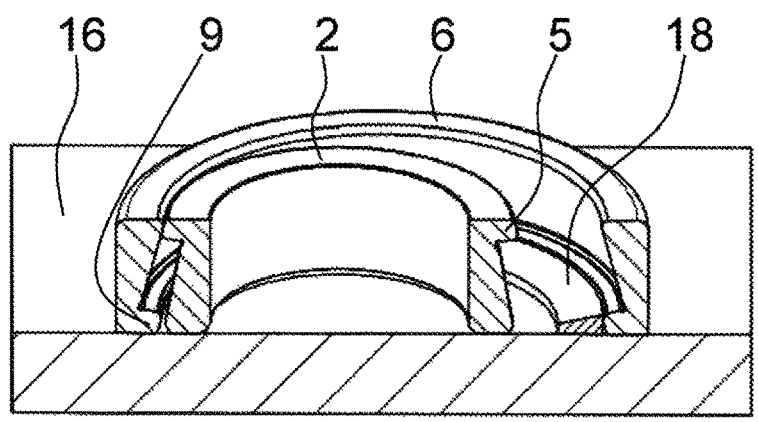

Similarly to the first variant, it is then the case in a second step that the inner bearing ring 2 is arranged, with its face side formed with the rim 5 upward, eccentrically with respect to the outer bearing ring 6 such that, as can be seen in FIGS. 6a and 6b, at one side, the auxiliary ramp 18 is arranged between the bearing rings 2, 6 and, at the other side, offset 180° with respect to the center of the auxiliary ramp 18, the bearing rings 2, 6 bear against one another.

Figure 7A:
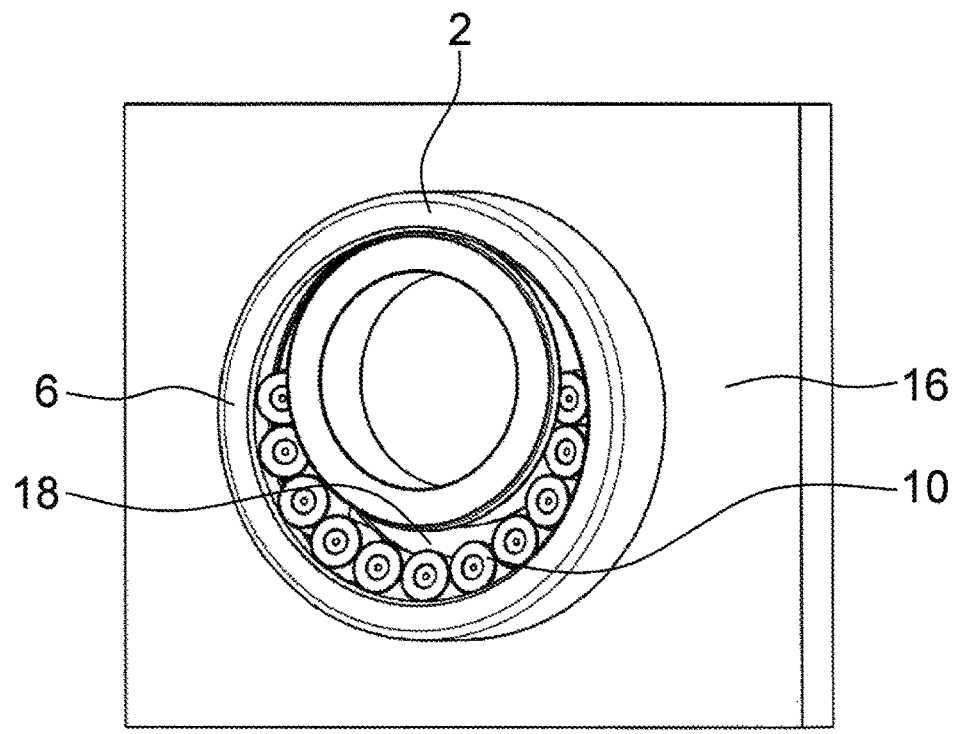
FIGS. 7a, 7b show an illustration of the third step of the second variant of the assembly method according to the disclosure in a plan view and in a sectional view.
Figure 7B:
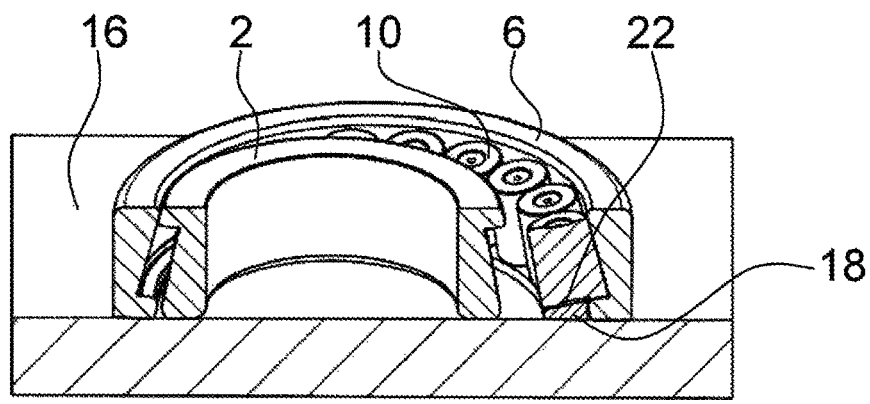

Then, in a third step illustrated in FIGS. 7a and 7b, it is the case here too that the sickle-shaped free space formed between the inner bearing ring 2 and the outer bearing ring 6 is filled with the roller-type rolling bodies 10 in the form of tapered rollers, but with the difference that, here, the relatively large face sides of said roller-type rolling bodies 10 lie on the oblique side 22 of the auxiliary ramp 18.

Figure 8A:
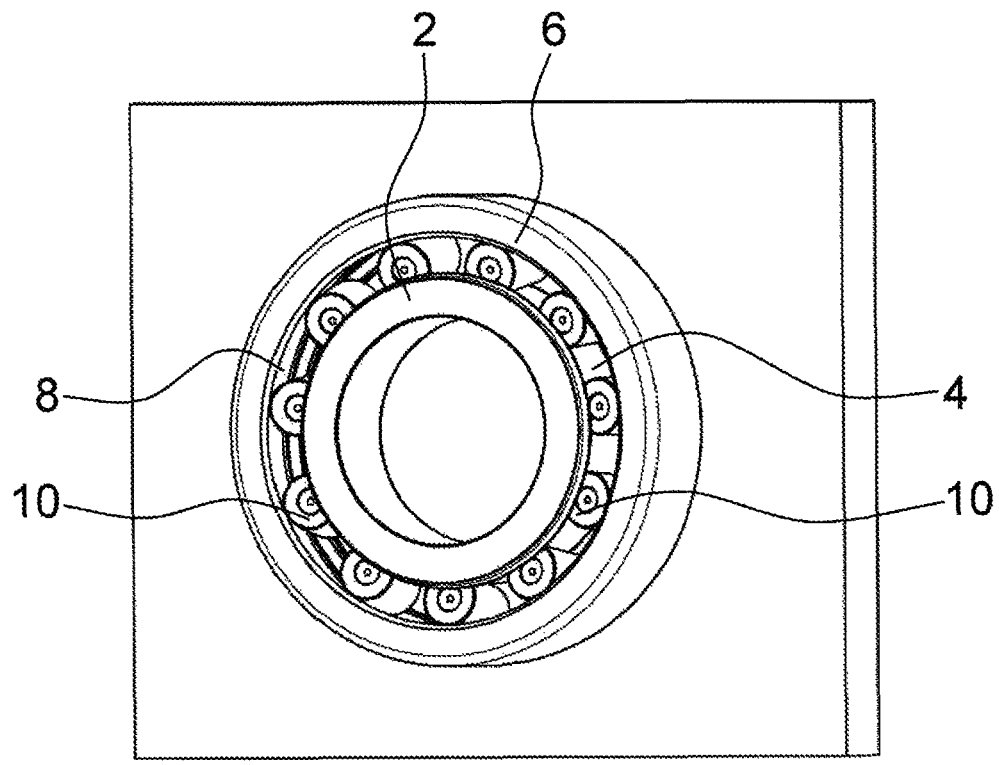
FIGS. 8a, 8b show an illustration of the fifth step of both variants of the assembly method according to the disclosure in a plan view and in a sectional view.
Figure 8B:
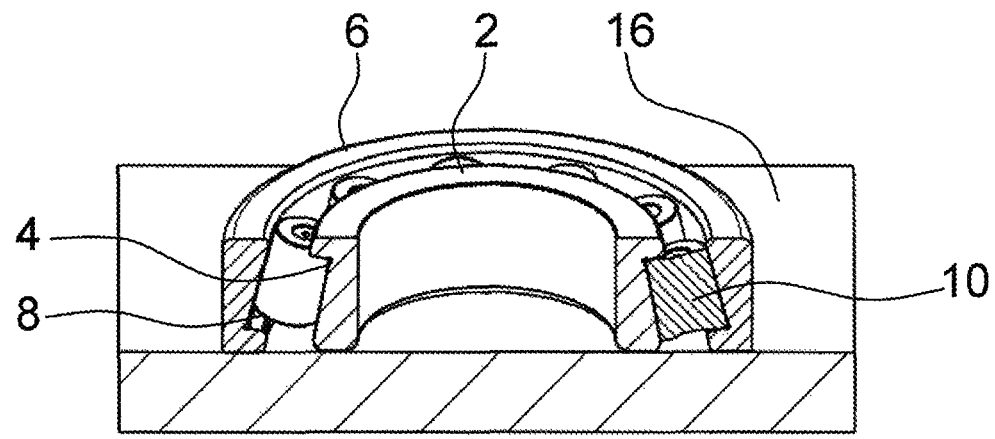

Independently of the two variants of the eccentric assembly method, it is then the case in a fourth step which is not illustrated in any more detail in the drawings that the outer bearing ring 3 is clamped, at the level of the contact point with the inner bearing ring 2 and at the level of a point on the outer shell surface of said outer bearing ring which is offset 180° with respect to the contact point, such that the outer bearing ring 3 is slightly ovalized within its elasticity limit. Subsequently, as can be seen from FIGS. 8a and 8b, in a fifth step, the inner bearing ring 2 is displaced into a coaxial position with respect to the outer bearing ring 3, and the roller-type rolling bodies 10 are uniformly circumferentially distributed in their raceways 4, 8 in the bearing rings 2, 6, with the ovalization of the outer bearing ring 3 being eliminated.

Figure 9A:
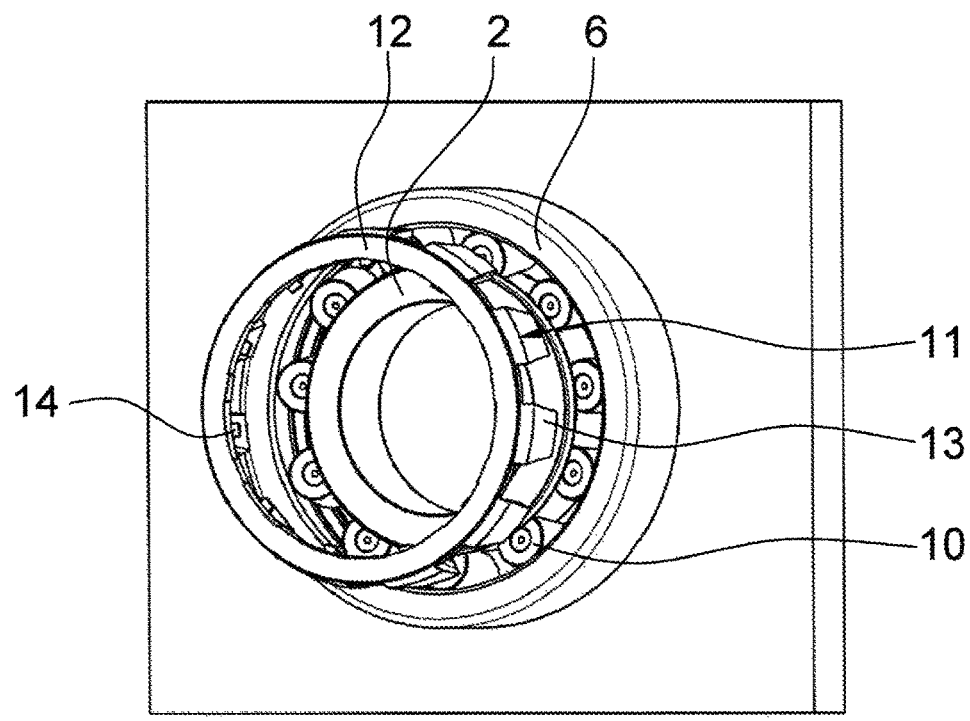
FIGS. 9a, 9b show an illustration of the sixth step of both variants of the assembly method according to the disclosure in a plan view and in a sectional view.
Figure 9B:
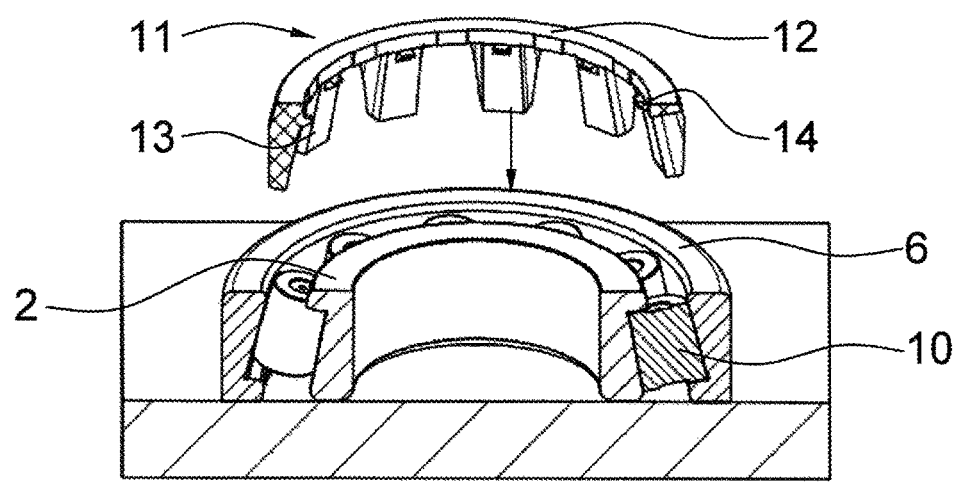

In the case of the first variant of the eccentric assembly method according to the disclosure being implemented, it is then the case in a sixth step, which for the sake of simplicity is however not illustrated in the drawings, that the bearing cage 11 in the form of a comb-type cage is inserted with its cage webs 13 between the roller-type rolling bodies 10 from the side with the relatively large face sides of said roller-type rolling bodies, and said bearing cage is engaged with its detent webs with detent action against the inner surface of the rim 9 on the outer bearing ring 6. In the case of the second variant of the eccentric assembly method according to the disclosure being implemented, it is by contrast the case in a sixth step that the bearing cage 11 in the form of a comb-type cage is, as shown in FIGS. 9a and 9b, inserted with its cage webs 13 between the roller-type rolling bodies 10 from the side with the relatively small face sides of said roller-type rolling bodies, and, as shown in FIG. 1, said bearing cage is engaged with its detent lugs 14 with detent action against the inner surface 15 of the rim 5 on the inner bearing ring 2.

Finally, FIGS. 10a, 10b and 11a, 11b illustrate the auxiliary ramps 17 and 18 for carrying out the two variants of the eccentric assembly method according to the disclosure. Here, the auxiliary ramp 17 used for the first method variant is distinguished by the fact that it bears with its inner diameter side 19 against the inner bearing ring 2 and, as can be clearly seen in FIGS. 10a and 10b, has an oblique side 21, which tapers toward the outer bearing ring 6 with the angle of inclination of the raceway 4 in the inner bearing ring 2, and a maximum ramp height hR which corresponds to the rim height hBI on the inner bearing ring 2.

By contrast, the auxiliary ramp 18 used for the second method variant is distinguished by the fact that it bears with its outer diameter side 20 against the outer bearing ring 6 and, as can be seen in FIGS. 11a and 11b, has an oblique side 22, which tapers toward the inner bearing ring 2 with the angle of inclination of the raceway 8 in the outer bearing ring 6, and a maximum ramp height hR which corresponds to the rim height hBA on the outer bearing ring 6.

LIST OF REFERENCE DESIGNATIONS

Radial rolling bearing
Inner bearing ring
Tangent to the outer shell surface of 2
Inner raceway in 2
Rim on 4
Outer bearing ring
Tangent to the inner shell surface of 6
Outer raceway in 6
Rim on 8
Roller-type rolling body
Bearing cage
Cage ring of 11
Cage webs on 12
Detent lugs on 13
Inner surface of 5
Assembly plane
Auxiliary ramp
Auxiliary ramp
Inner diameter side of 17
Outer diameter side of 18
Oblique side on 17
Oblique side on 18
AL Bearing central axis
δ Taper angle
β Envelope circle angle
SL Gap between 2 and 6
SR Gap between 2 and 6
DW Greatest diameter of 10
hBI Rim height on 2
hBA Rim height on 6
hR Ramp height

The invention claimed is:

1. A method for assembling an angular contact roller bearing, comprising:
    an angular contact roller bearing assembled in accordance with an eccentric assembly method for deep-groove ball bearings, the angular contact ball bearing comprising:
        an inner bearing ring with an inner raceway, which is arranged on an outer shell surface of said inner bearing ring so as to be oblique with respect to a bearing axis of rotation (AL), and comprising a rim which delimits said inner raceway at its smallest diameter;
        an outer bearing ring with an outer raceway, which is arranged on an inner shell surface of said outer bearing ring so as to be oblique with respect to the bearing axis of rotation (AL), and comprising a rim which delimits said outer raceway at its greatest diameter; and
        a multiplicity of roller-type rolling bodies which are arranged between the bearing rings and which roll on the raceways of said bearing rings and which are held with uniform spacings to one another in a circumferential direction by a bearing cage;
    wherein a tangent to the outer shell surface of the inner bearing ring and a tangent to the inner shell surface of the outer bearing ring are, at least in a region of the raceways, of planar form so as to run in opposite directions obliquely with respect to the bearing axis of rotation (AL);
    the raceways of the two bearing rings are each formed in conical fashion into said shell surfaces; and
    the rims which are thus formed and which delimit the raceways in each case on one side are thus each formed integrally with the bearing rings;
    wherein, in a first step, the inner bearing ring is placed, with its face side formed with the rim, onto a horizontal assembly plane with a convex sickle-shaped auxiliary ramp in such a way that said inner bearing ring bears with its rim against an inner diameter side of the auxiliary ramp.

2. The method as claimed in claim 1, wherein, in a second step, the outer bearing ring is arranged, with its face side formed with the rim upward, eccentrically with respect to the inner bearing ring such that, at one side, the auxiliary ramp is arranged between the bearing rings and, at the other side, offset 180° with respect to a center of the auxiliary ramp, the bearing rings bear against one another.

3. The method as claimed in claim 2, wherein in a third step, a sickle-shaped free space formed between the outer bearing ring and the inner bearing ring is filled with the rolling bodies in the form of tapered rollers such that relatively small face sides of said rolling-bodies smiling bodies lie on an oblique side of the auxiliary ramp.

4. The method as claimed in claim 3, wherein, in a fourth step, the outer bearing ring is clamped, at a level of a contact point with the inner bearing ring and at a level of a point on the outer shell surface of said outer bearing ring which is offset 180° with respect to the contact point, such that the outer bearing ring is slightly ovalized within its elasticity limit.

5. The method as claimed in claim 4, wherein, in a fifth step, the inner bearing ring is displaced into a coaxial position with respect to the outer bearing ring, and the uniformly circumferentially distributed in their raceways in the bearing rings, with the ovalization of the outer bearing ring being eliminated.

6. The method as claimed in claim 5, wherein, in a sixth step, the bearing cage in the form of a comb-type cage is inserted with cage webs between the rolling bodies from a side with relatively small face sides of said rolling bodies, and said bearing cage is engaged with detent lugs with detent action against an inner surface of the rim on the inner bearing ring.

7. The method as claimed in claim 5, wherein, in a sixth step, the bearing cage in the form of a comb-type cage is inserted with cage webs between the rolling bodies from a side with relatively large face sides of said rolling bodies, and said bearing cage is engaged with detent webs with detent action against an inner surface of the rim on the outer bearing ring.

8. A device for carrying out the method as claimed in claim 3, wherein the auxiliary ramp which bears with its inner diameter side against the inner bearing ring has an oblique side, which tapers toward the outer bearing ring with an angle of inclination of the raceway in the inner bearing ring, and a maximum ramp height (hR) which corresponds to a rim height (hBI) on the inner bearing ring.

9. A method for assembling an angular contact roller bearing, comprising:
   an angular contact roller bearing is assembled in accordance with an eccentric assembly method for deep-groove ball bearings, the angular contact ball bearing comprising:
      an inner bearing ring with an inner raceway, which is arranged on an outer shell surface of said inner bearing ring so as to be oblique with respect to a bearing axis of rotation (AL), and comprising a rim which delimits said inner raceway at its greatest diameter; and
      a multiplicity of roller-type rolling bodies which are arranged between the bearing rings and which roll on the raceways of said bearing rings and which are held with uniform spacings to one another in a circumferential direction by a bearing cage;
      wherein a tangent to the outer shell surface of the inner bearing ring and a tangent to the inner shell surface of the outer bearing, ring are, at least in a region of the raceways, of planar form so as to run in opposite directions obliquely with respect to the bearing, axis of rotation (AL),
      the raceways of the two bearing rings are each formed in conical fashion into said shell surfaces; and
      the rims which are thus formed and which delimit the raceways in each case on one side are thus each formed integrally with the bearings rings;
   wherein, in a first step, the outer bearing ring is placed, with its face side formed with the rim, onto a horizontal assembly plane with a convex sickle-shaped auxiliary ramp in such a way that said outer bearing ring bears with its rim against an outer diameter side of the auxiliary ramp.

10. The method as claimed in claim 3, wherein, in a second step, the inner bearing ring is arranged, with its face side formed with the rim upward, eccentrically with respect to the outer bearing ring such that, at one side, the auxiliary ramp is arranged between the bearing rings and, at the other side, offset 180° with respect to a center of the auxiliary ramp, the bearing rings bear against one another.

11. The method as claimed in claim 10, wherein, in a third step, a sickle-shaped free space formed between the inner bearing ring and the outer bearing ring is filled with the rolling bodies in the form of tapered rollers such that relatively large face sides of said rolling bodies lie on an oblique side of the auxiliary ramp.

12. A device for carrying out the method as claimed in claim 11, wherein the auxiliary ramp which bears with its outer diameter side against the outer bearing ring has an oblique side, which tapers toward the inner bearing ring with an angle of inclination of the raceway in the outer bearing ring, and a maximum ramp height (hR) which corresponds to a rim height (hBA) on the outer bearing ring.

13. An angular contact roller bearing comprising:
   an inner bearing ring with an inner raceway, which is arranged on an outer shell surface of said inner bearing ring so as to be oblique with respect to a bearing axis of rotation (AL), and comprising a rim which delimits said inner raceway at its smallest diameter;
   an outer bearing ring with an outer raceway, which is arranged on an inner shell surface of said outer bearing ring so as to be oblique with respect to the bearing axis of rotation (AL), and comprising a rim which delimits said outer raceway at its greatest diameter; and
   a multiplicity of roller-type rolling bodies which are arranged between the bearing rings and which roll on the raceways of said bearing rings and which are held with uniform spacings to one another in a circumferential direction by a bearing cage;
   wherein a tangent to the outer shell surface of the inner bearing ring and a tangent to the inner shell surface of the outer bearing ring are, at least in a region of the raceways, of planar form so as to run in opposite directions obliquely with respect to the bearing axis of rotation (AL);
   the raceways of the two bearing rings are each formed in conical fashion into said shell surfaces; and
   the rims which are thus formed and which delimit the raceways in each case on one side are thus each formed integrally with the bearing rings;
   wherein the angular contact roller bearing is assembled in accordance with an eccentric assembly method for deep-groove ball bearings;
   wherein, in a first step, the inner bearing ring is placed, with its face side formed with the rim, onto a horizontal assembly plane with a convex sickle-shaped auxiliary ramp in such a way that said inner bearing ring bears with its rim against an inner diameter side of the auxiliary ramp.

* * * * *